United States Patent Office 3,734,866
Patented May 22, 1973

3,734,866
Sargeant E. Aylies, Youngstown, N.Y., and Mial T. Hillhouse, Alexander Kyriakis, and Brian W. Pengilly, Akron, Ohio, assignors to The Goodyear Tire & Rubber Company, Akron, Ohio
No Drawing. Application Ser. No. 648,933, June 26, 1967, now Pat. No. 3,634,339, dated Jan 11, 1972, which is a continuation-in-part of abandoned application Ser. No. 361,551, Apr. 21, 1964. Divided and this application June 9, 1971, Ser. No. 151,518
Int. Cl. C08g 33/00, 33/02
U.S. Cl. 260—2 R                      2 Claims

ABSTRACT OF THE DISCLOSURE

The invention relates to polymeric aromatic compounds and to the preparation of these materials by polymerizing the monomeric aromatic compound using a catalyst comprising an active metal halide, chloranil and water. These polymers are linear chains of aromatic rings attached together.

This application is a division of our application Ser. No. 648,933, filed June 26, 1967, now U.S. Pat. No. 3,634,399, issued Jan. 11, 1972, which was a continuation-in-part of our application Ser. No. 361,551, filed Apr. 21, 1964, now abandoned.

This invention relates to a method for preparing polymeric compositions from aromatic compounds. More particularly the invention relates to an improved catalyst for preparing polymeric products from aromatic compounds and to the products prepared.

It is an object of the invention to provide a new catalyst system for polymers from aromatic compounds. Another object of the invention is to produce new polymeric materials which are thermally stable. Other objects will appear hereinafter as the description of the invention proceeds.

According to the invention polymeric aromatic materials are made from aromatic compounds by treating such compounds with an active metal halide catalyst in the presence of chloranil.

In the practice of the invention various active metal halide catalysts can be used. Representative examples of such metal halides are aluminum chloride, ferric chloride, molybdenum pentachloride and niobium pentachloride. Other active metal halide catalysts can be used if desired. The ratio of the aromatic compound to the active metal halide catalyst used can be varied over a wide range. The ratio of 2 to 1 is preferred because this ratio gives the highest yield of product. Yields are somewhat lower with ratios in which the metal chloride is smaller. Thus the yields appear to be directly dependent on the amount of metal chloride used. Traces of metal chloride give traces of polymer. Higher amounts of metal chloride give yields that are in proportion to the amount of metal chloride used. As stated above, the molar ratio of 2 to 1 aromatic compound to metal chloride gives the highest yields.

The system need not be completely anhydrous to obtain the advantageous results of the invention. The presence of some water is beneficial. Thus the ratio of the metal chloride to water may be varied over a wide range from trace amounts such as usually are present in technically pure hydrocarbon solvents up to molar ratios in the range of from 1 to 10 water to metal chloride can be used. The yield of product decreases somewhat as the percentage of water is increased. Thus a ratio of 1:5 of water to aluminum chloride gives considerably lower yields than the ratio of 1:10 of water to aluminum chloride. Higher amounts of water eventually deactivate the system because the water reacts with the aluminum chloride to form aluminum hydroxide which is ineffective as a catalyst in this system.

The temperature at which the reactions are carried out may be varied over a wide range. Thus the reactions may be carried out at a temperature in the range of from 0° C. to the boiling point of the mixture. A temperature in the range of from about 40° C. to about 50° C. is usually used. At lower temperatures, longer times are required for initiation of the reaction. The reactions are usually run at atmospheric pressure.

The reactions can be carried out in the presence of diluents if desired. Diluents that can be used are inert materials which do not enter into the reactions and do not react with and deactivate the catalyst or other materials present. Representative examples of diluents that can be used are saturated hydrocarbons such as heptane, hexane, and cycloaliphatic compounds such as cyclohexane.

In carrying out the process it is beneficial to use an agitator which rotates rapidly and breaks up any lumps of materials that may form in the reaction mixture. It is desirable to use an agitator which will keep the aluminum chloride and other reactants thoroughly intermixed so that they may react effectively.

The usual practice in operating the process is to add the aromatic compound to the reactor and then the metal chloride and the water. Except when small batches of the materials are made the chloranil will be added in small increments. This will prevent foaming of the reaction mixture and allow the reactions to be carried out smoothly.

It is believed that in the reaction the metal chloride forms a complex with the aromatic compound and the chloranil acts as a hydrogen acceptor to remove hydrogen from the activated complex. Thus the reactions may be considered to be in the nature of oxidation reactions in which the aromatic ring of the aromatic compound is oxidized by loss of hydrogen which is removed from the ring by the chloranil. In turn the chloranil is reduced to the corresponding tetrachloro hydroquinone product. It is preferred, therefore, to use the chloranil in a stoichiometric amount in relation to the metal halide used so that it can react with the hydrogen released from the complex. The yields of product depend on the amount of chloranil compound used. Thus if the chloranil compound is used in somewhat less than stoichiometric amount the yield of product will be in proportion to the amount of chloranil compound used.

The invention provides a process for preparing polymeric aromatic compounds and new aromatic polymers. The new materials are poly-ring compounds, and are linear materials in contrast to condensed ring systems.

Substitution on chlorobenzene generally occurs in the ortho and para positions. Of the two, the para is favored. Thus it is considered that monomeric chlorobenzene is activated in the para position by the catalyst and the net effect is that in the polymerization reaction propagating polymer joins to new monomer at its activated position para to the chlorine. This reaction may be symbolized as follows:

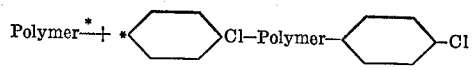

The addition of the propagating polymer in the para position of the incoming monomers then causes the newly attached terminal ring to be activated so that the new propagating polymer molecule may be represented as follows:

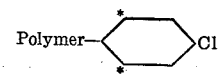

In the above formula * represents activated positions unhampered by steric hindrance factors.

Since additional monomeric chlorobenzene can be added to either of the two activated equivalent positions on the terminal phenyl ring, further addition of monomeric chlorobenzene takes place in the same manner to form polymer comprised of units which may be represented as follows:

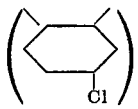

While the formation of ortho substituted product is theoretically possible, the amount formed is thought to be negligible.

The formation of polymers of toluene and methoxy benzene (anisole) is promoted by the same mechanism but in these cases the para position is somewhat less favored and substitution occurs randomly in the ortho and para positions. In the polymers, the polymer molecule formed contains units which may be represented as:

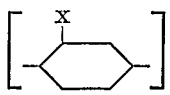

and

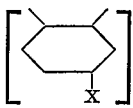

where X represents the groups methyl and methoxy.

Nuclear magnetic resonance studies of the toluene polymer show two kinds of hydrogen present in the polymer molecule. They are the hydrogen atoms attached to the aromatic rings and hydrogen atoms on the alkyl or methyl group. These studies indicate an absence of methylene hydrogen. They also show the presence of two types of methyl groups. The ratio of these methyl groups is from about 2:1 to 1:1. Thus the polymer molecule consists of chains of aromatic rings attached through carbon atoms, with side chains attached to the rings as indicated in the above formula.

Pyrrole, because of its aromatic character, also forms polymer by the same mechanism. Its polymer is a regular structure in which the units may be represented by the formula:

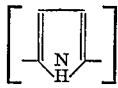

Azobenzene also forms polymer having regular structure in which the units may be represented as having a regular structure as in the formula:

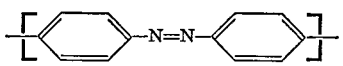

Naphthalene and anthracene form polymer as would be expected from unsubstituted aromatic compounds. These polymers are poly ring compounds having linear structure in which the rings are attached directly through the ring carbon atoms.

The following examples illustrate the practice of the invention.

EXAMPLE 1

A 500 milliliter 3-neck flask equipped with an efficient condenser, a mechanical stirrer, and a nitrogen inlet tube with a thermometer was charged with 1 mole of benzene. 0.250 mole of aluminum chloride and 0.055 mole of water were added and the mixture was vigorously stirred. 0.200 mole of chloranil was added and the reaction mixture was heated to a temperature of 75° C. for 8 hours. Then a 1-to-1 water concentrated hydrochloric acid solution was added to deactivate the catalyst. The mixture was filtered through a fritted glass funnel. The polymer was removed from the filter and triturated with a 1-to-1 water concentrated hydrochloric acid solution and finally washed with distilled water. The product was dried in an electric oven at 105° C. It was an amorphous material which crystallized upon heating at a temperature between 250–300° C. under vacuum.

EXAMPLE 2

One mole of toluene was polymerized according to the procedure of Example 1 using 0.250 mole of aluminum chloride, 0.055 mole of water and 0.125 mole of chloranil as catalyst. The product obtained was an amorphous material which did not crystallize on heating. It had a softening point of 265° C.

EXAMPLE 3

One mole of chlorobenzene was polymerized according to the procedure of Example 1 using 0.250 mole of aluminum chloride, 0.055 mole of water and 0.125 mole of chloroanil as catalyst. The product obtained was an amorphous material which crystallized on heating at a temperature between 175–225° C. under vacuum. It had a melting point above 340° C.

EXAMPLE 4

One mole of benzene was polymerized according to the procedure of Example 1 using 0.5 mole of ferric chloride, 0.11 mole of water and 0.25 mole of chloranil as catalyst. The product was a material similar to the product obtained in Example 1.

EXAMPLE 5

One mole of benzene was polymerized according to the procedure of Example 1 using 0.5 mole of molybdenum pentachloride, 0.11 mole of water and 0.25 mole of chloranil as catalyst. The product was a material similar to the product obtained in Example 1.

The examples illustrate the invention particularly with respect to polymerizing benzene, toluene and chlorobenzene. The method of the invention can also be used to polymerize other aromatic compounds. Representative examples of aromatic compounds that can be polymerized are compounds such as naphthalene, anthracene, pyrrole, azobenzene, and anisole. Thus the method of the invention can be used to produce various polyaromatic polymers. Representative examples of such polymers are polyphenyl, polymeric toluene, polymeric pyrrole, polypolyphenyl, polymeric and polymeric anisole.

The products prepared by the method of the invention are highly stable, high melting materials. They can be processed in to useful products by cold pressing techniques and by sintering processes. The preparation of molded goods from products of the invention is illustrated in the following examples.

EXAMPLE 6

A small sample of parapolyphenyl was pressed at room temperature at a pressure of 5 tons per square inch for 10 seconds. The round pellet obtained was sintered in a furnace at 500° C. for 10 minutes. The flexure strength was 2,989 pounds per square inch.

EXAMPLE 7

A small amount of parapolyphenyl was pressed at room temperature under a pressure of 60 tons per square inch for 10 seconds. The shaped article was sintered in a furnace at 500° C. for 10 minutes. The flexure strength of the article was 2,724 pounds per square inch.

In forming sintered articles from the products of the invention, the materials are sintered at a temperature above about 175° C. It is obvious that the sintering will be carried out at a temperature below the melting temperature of the polymers.

The products of the invention are unique high melting thermally stable polymers which are useful in industrial applications and for other uses where resistance to decomposition at high temperature is desirable. Thus the polymers of the invention are useful for coating metals which are used in high temperature applications. Pipes and electrical conductors and other articles which are used at elevated temperatures can be coated and protected with coatings of polymers of the invention. In addition, molded articles which are stable at high temperatures can be made from the materials of the invention. Various other applications will be apparent to those skilled in the art. The materials are particularly resistant to erosion and to burning at high temperatures. For example, a sample of parapolyphenyl was subjected to a temperature of about 4,700° F. for 15 seconds. It showed a char erosion rate of only 2 mils per second.

While certain representative embodiments and details have been shown for the purpose of illustrating the invention, it will be apparent to those skilled in this art that various changes and modifications may be made therein without departing from the spirit or scope of the invention.

What we claim is:

1. The process of preparing a polymeric composition of an aromatic compound selected from the group consisting of benzene, toluene, chlorobenzene, naphthalene, anthracene, pyrrole and azobenzene which comprises treating the aromatic compound with an active metal halide selected from the group consisting of aluminum chloride, ferric chloride, molybdenum pentachloride and niobium pentachloride in the presence of chloranil at a temperature of from 0° C. to the boiling point of the mixture and separating the polymeric aromatic composition produced.

2. The process of claim 1 in which the aromtic compound is reacted in the ratio of 2 mols of aromatic compound to 1 mol of active metal halide to from 0.5 to 1 mol of chloranil and from trace amounts of water to 0.01 mol of water.

References Cited

UNITED STATES PATENTS

| 3,320,183 | 5/1967 | Brown | 260—2 |
| 3,634,339 | 1/1972 | Aylies et al. | 260—2 |

FOREIGN PATENTS

| 1,016,024 | 9/1957 | Germany | 260—2 |

OTHER REFERENCES

Kovacic et al.: "Jour. Organic Chemistry," vol. 29 (January 1964), pp. 100–104.

SAMUEL H. BLECH, Primary Examiner

U.S. Cl. X.R.

117—132 R, 132 B, 232; 260—2 H, 47 R, 88.3 R; 264—126

UNITED STATES PATENT OFFICE
CERTIFICATE OF CORRECTION

Patent No. 3,734,866          Dated May 22, 1973

Inventor(s) AYLIES, SARGEANT E., ET. AL.

It is certified that error appears in the above-identified patent and that said Letters Patent are hereby corrected as shown below:

Column 4, line 48, cancel "poly-"; line 49, cancel "polyphenyl"; same line, after "polymeric", first occurrence, insert -- azobenzene -- .

Signed and sealed this 25th day of December 1973.

(SEAL)
Attest:

EDWARD M. FLETCHER,JR.　　　　RENE D. TEGTMEYER
Attesting Officer　　　　　　　Acting Commissioner of Patents